J. H. CHEEVER.
METAL AND RUBBER TIRES COMBINED.
No. 86,504. Patented Feb. 2, 1869.
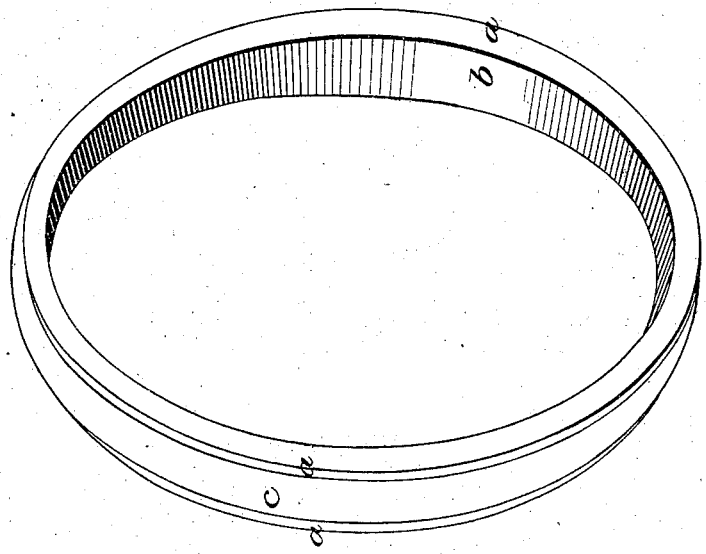

UNITED STATES PATENT OFFICE.

JOHN H. CHEEVER, OF NEW YORK, N. Y.

IMPROVEMENT IN METAL AND RUBBER TIRES COMBINED.

Specification forming part of Letters Patent No. 86,504, dated February 2, 1869.

*To all whom it may concern:*

Be it known that I, JOHN H. CHEEVER, of New York, in the county and State of New York, have invented certain new and useful Improvements in India-Rubber Tires for the Wheels of Carriages and other Vehicles; and I hereby declare the following to be a full, clear, and exact description of the same, reference being had to the accompanying drawings, in which—

Figure 1 is a perspective view of a rubber tire combined with a metal tire in accordance with my invention. Fig. 2 is a transverse section of the same, and Fig. 3 is a like section through the rubber when detached from the metal rim.

India-rubber tires have heretofore been applied to carriage-wheels by stretching them over metal rims or tires provided with dovetailed or other shaped grooves, or with converging flanges, to receive and hold the rubber.

My invention relates to the formation of rubber tires, to be used with such wheels as are provided with dovetailed grooves in their rims, and the new results and advantages attained by it can best be explained by first specifying the difficulties and disadvantages attending the use of rubber tires as they have been hitherto formed. The shape of a tire of this kind has been ordinarily rectangular, that part of it which extends into the grooved rim being of the same size, so far as breadth or width is concerned, as that which projects from the rim. The consequence of this is—

First. As the sides of the rubber tire are straight and the sides of the grooves are slanting, the rubber at or near the bottom of the groove is not in perfect contact with the sides of the groove, and is subject to little or no lateral compression compared with that which it receives at the periphery of the rim, where the converging sides of the groove nearest approach each other. Consequently the rubber tire can be twisted or vibrated from side to side; and when its projecting part is subjected to lateral pressure, as is often the case in the passage of the wheel over uneven or rough roads, or over street-railway tracks, one side of the rubber which is held in the metal rim is depressed and forced into the groove, while the other side is lifted or twisted out therefrom, so that there is little security that the rubber will remain for any length of time in place.

Second. The foregoing difficulty is also occasioned, in part, by the square or angular formation of the tire above the metal rim, the tread of the rubber tire equaling or exceeding in width the distance between the upper end of the converging flanges of the dovetailed groove, so that when one side of the tire is subjected to pressure the top of the flange on the opposite side forms, as it were, a fulcrum, upon which the rubber is tilted, so as to be raised and lifted out from its grooves, and the tire is thus detached and separated from its seat.

In order, therefore, to give practical value to wheels of this kind, it becomes necessary to devise a rubber tire which shall be free from the above-named objectionable features, and this is the object of my invention, which consists in the combination, with a dovetail-grooved metal rim, of a rubber tire having a semi-cylindrical form in cross-section, so that the sides of the tire shall be in close contact with the sides of the groove and equally compressed at every point, and so that the tread of the tire shall be of less width than the groove, and located centrally, as near as possible, between the two sides of the groove.

The form of the rubber tire $c$ is shown plainly in Fig. 3 as being semi-cylindrical or half-round. It should have a diameter exceeding the width of the bottom of the dovetailed groove $a$ in the metal rim $b$, so that when stretched over the wheel, as shown in Figs. 1 and 2, it may fill every part of the groove, its flat base resting upon the bottom of the groove, its rounded sides being in close contact with and bearing equally at every point against the converging sides of the groove, and its apex or highest part (forming the tread of the wheel) being less in width than the top of the groove, and nearly equidistant from the sides of the same.

It will be seen, therefore, that owing to this formation of the tire any pressure upon its tread will be transmitted uniformly to every part of the rubber, which will be pressed equally against both sides of the groove. A like result, with but little variation, will be produced if the tire be subjected to a lateral instead of a directly-vertical pressure; and the wheel can pass over railway-tracks or rough places without any danger of the rubber becoming displaced.

Having now described my invention and the manner in which the same is or may be carried into effect, what I claim, and desire to secure by Letters Patent, is—

The combination, in wheels with metal rims having dovetailed grooves or converging flanges, as described, of vulcanized rubber tires having a semi-cylindrical form in cross-section, substantially in the manner and for the purposes shown and set forth.

In testimony whereof I have signed my name to this specification before two subscribing witnesses.

JOHN H. CHEEVER.

Witnesses:
F. M. GEROW,
JOHN L. COBB.